United States Patent

Keller et al.

(10) Patent No.: US 6,529,705 B1
(45) Date of Patent: Mar. 4, 2003

(54) COMPUTERIZED SCIENTIFIC METHOD EDUCATIONAL SYSTEM FOR COLLECTING AND ANALYZING DATA FROM PRERECORDED EXPERIMENTS

(75) Inventors: Harry E. Keller, Cambridge, MA (US); Edward E. Keller, Hermosa Beach, CA (US); Caroline L. Keller, Hermosa Beach, CA (US); Jayne E. S. Keller, Cambridge, MA (US)

(73) Assignee: Paracomp, Inc., Cambridge, MA (US)

( * ) Notice: Subject to any disclaimer, the term of this patent is extended or adjusted under 35 U.S.C. 154(b) by 0 days.

(21) Appl. No.: 09/613,438

(22) Filed: Jul. 11, 2000

Related U.S. Application Data

(60) Provisional application No. 60/143,368, filed on Jul. 12, 1999.

(51) Int. Cl.[7] .................................................. G09B 7/00
(52) U.S. Cl. ....................... 434/362; 434/118; 434/276; 434/350; 434/365
(58) Field of Search ................................ 434/118, 219, 434/267, 276, 307 R, 308, 319, 338, 322, 323, 335, 350, 362, 365, 432; 463/23; 345/419, 422, 473, 582, 643, 733, 753, 764, 863, 978; 382/186, 189; 700/2, 49, 83, 181; 703/2, 6, 11; 704/1; 707/2, 3, 5, 104.1, 501.1, 514, 526, 528–533, 539; 706/10, 46, 50, 59, 61; 708/144; 709/218; 710/5, 73; 714/733; 725/110, 112

(56) References Cited

U.S. PATENT DOCUMENTS

| | | | | |
|---|---|---|---|---|
| 4,518,361 A | * | 5/1985 | Conway | 434/307 R |
| 4,804,328 A | * | 2/1989 | Barrabee | 434/308 |
| 5,240,419 A | * | 8/1993 | deGyarfas | 434/322 |
| 5,241,671 A | * | 8/1993 | Reed et al. | 707/104.1 |
| 5,261,041 A | * | 11/1993 | Susman | 345/473 |
| 5,446,891 A | * | 8/1995 | Kaplan et al. | 707/2 |
| 5,484,293 A | * | 1/1996 | Ford et al. | 434/432 |
| 5,561,811 A | * | 10/1996 | Bier | 710/5 |
| 5,596,698 A | * | 1/1997 | Morgan | 345/863 |
| 5,680,590 A | | 10/1997 | Parti | |
| 5,737,340 A | * | 4/1998 | Tamarapalli et al. | 714/733 |
| 5,741,135 A | * | 4/1998 | Bennett | 434/118 |
| 5,813,865 A | | 9/1998 | Greenbowe et al. | |
| 5,846,086 A | * | 12/1998 | Bizzi et al. | 434/247 |
| 5,963,447 A | * | 10/1999 | Kohn et al. | 700/49 |
| 6,018,768 A | * | 1/2000 | Ullman et al. | 709/218 |
| 6,261,103 B1 | * | 7/2001 | Stephens et al. | 434/276 |

FOREIGN PATENT DOCUMENTS

| | | |
|---|---|---|
| WO | WO 99/33041 | 7/1999 |
| WO | WO 01/04865 | 1/2001 |

\* cited by examiner

*Primary Examiner*—Joe H. Cheng
(74) *Attorney, Agent, or Firm*—Pillsbury Winthrop LLP

(57) ABSTRACT

Image sequences, video clips, or other sensorily perceptible representations of experiments, are combined with software and hardware for teaching science, critical thinking, and other subjects, to provide a learning process centered on Scientific Method. Experiments are run (or simulated) with various experimental parameters and are recorded on a storage device such as a network server. The reproduced experiment is combined with introductory material, hypotheses, vocabulary words and definitions, and other information to create course modules consisting of one or more segments. Small groups of students run software on separate computers to pick and view experiments, to collect data by interacting with the experiments, to analyze the collected data, and to prove hypotheses. Following each course segment the student groups present their findings to other class members and the teacher facilitates identification and understanding of the principles involved.

43 Claims, 8 Drawing Sheets

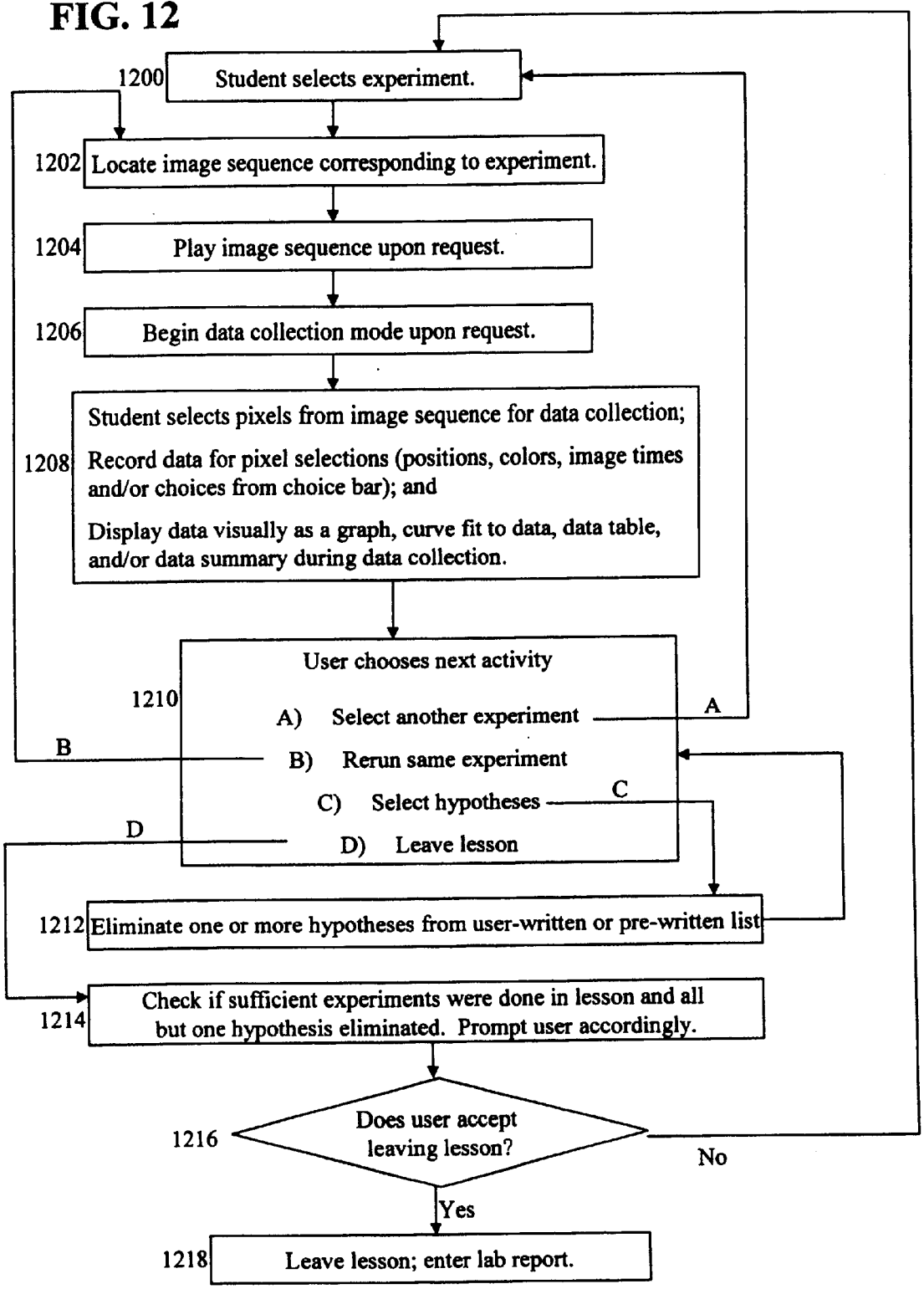

COMPUTERIZED SCIENTIFIC METHOD EDUCATIONAL SYSTEM FOR COLLECTING AND ANALYZING DATA FROM PRERECORDED EXPERIMENTS

CROSS REFERENCE TO RELATED APPLICATIONS

This application claims the benefit of U.S. Provisional Application No. 60/143,368, filed Jul. 12, 1999, the contents of which are incorporated herein by reference.

BACKGROUND ART

In the late $19^{th}$ and early $20^{th}$ centuries Simon Newcomb (an American astronomer), John Dewey (an American philosopher and educator), and others proposed the use of Scientific Method in teaching, especially in the teaching of science. However, today most students' experience in school is similar to that of Carl Sagan (an American astronomer):

There was an answer we were supposed to get. We were marked off if we didn't get it. There was no encouragement to pursue our own interests or hunches or conceptual mistakes.

Although many of today's classrooms are equipped with computer terminals and are connected to the Internet, the emphasis is still on rote memory of particular facts and principles rather than an understanding of how various facts and principles may be derived from careful observation and experimentation. Accordingly, observation, experimentation and heuristic reasoning plays little if any role in modem computer assisted education.

DISCLOSURE OF THE INVENTION

This invention puts Scientific Method at the center of the teaching and learning process. Real experiments are performed (or simulated) for a predefined range of experimental parameters and a humanly perceptible representation (preferably a sequence of images) of each experiment is stored on a data server, where they are retrievable for subsequent presentation on a student terminal.

Experimental data is collected in response to the student's interaction with the displayed experiment, using the terminal's user interface. For example, the student may select an object in a frame of a video image sequence to collect data comprised of the object's characteristics, such as position, and data measurements from the selected object's characteristics may be automatically calculated, recorded and reported to the student.

A programmed processor provides instructional feedback data to the student, preferably using summaries of the collected data, vocabulary words and definitions, and other information linked to one or more related experiments, to thereby create a course module consisting of one or more lessons.

In a preferred embodiment, students select experiments to run by selecting from parameters selected by the processor, which then retrieves and presents a perceptible representation of an associated experiment. Students are preferably encouraged to run multiple experiments using different.

The preferred embodiment also provides a data analysis phase following the data collection phase, in which graphs and data summaries provided during data collection aid students in analyzing the results by testing predefined hypotheses and identifying which have been proven true and which have been proven false. The data collection and data analysis process is preferably repeated in an iterative fashion until all hypotheses have been proven either true or false.

The inventive apparatus is defined in general terms in independent claim 1. Characteristic features of certain specific embodiments of the invention are set forth in the following description of a presently preferred embodiment, and in the appended dependent claims.

BRIEF DESCRIPTION OF THE DRAWINGS

FIG. 12 shows logic for selecting experiments and collecting data.

DETAILED DESCRIPTION OF A PREFERRED MODE

Overview

A "Programmed Processor" makes image sequences available to a student in accordance with a predetermined lesson plan. The Programmed Processor 110 provides for the combination of image sequences with lists of hypotheses, vocabulary words and definitions, and other information to create course modules consisting of one or more segments. One lesson contains one segment. Typically one segment requires one class period. The Programmed Processor preferably has, but is not required to have, a distributed architecture with both a local computer, called a "student terminal", and a remote data server.

Figure 2:
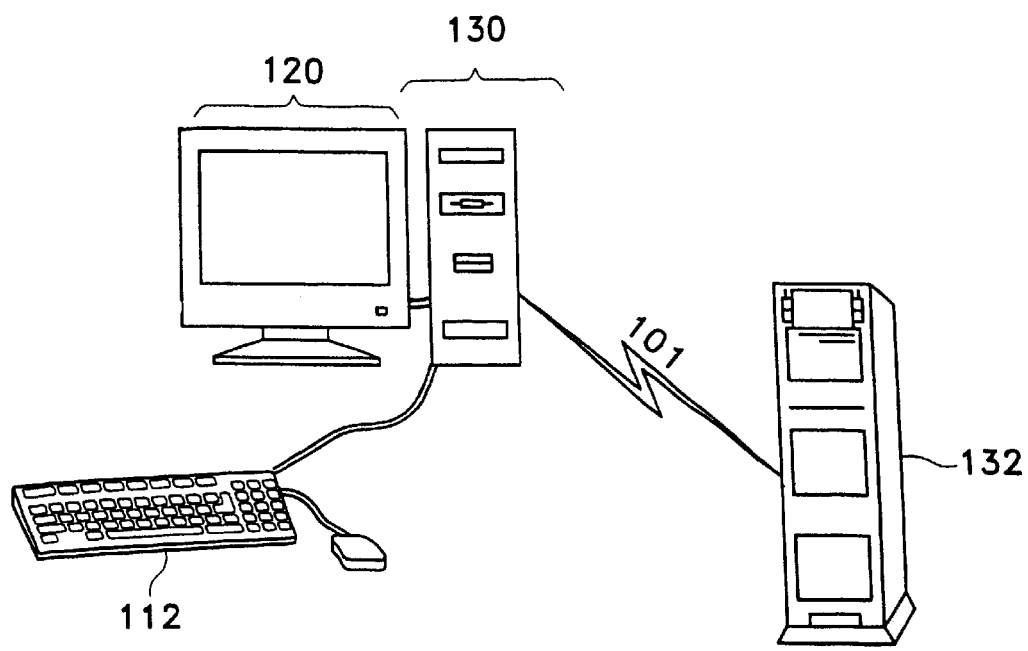
FIG. 2 shows the major hardware components connected to a single student terminal in a networked environment.

In one embodiment, as shown in FIG. 2, the Programmed Processor has a distributed architecture with a student terminal 130, with human interface elements 112 and 120, and data server 132. In this embodiment, the student terminal handles image display and user data collection. The data server handles storage and retrieval of student data and may also serve the image sequences for display by the student terminal. The student terminal is preferably connected to the data server over a LAN or Internet 101.

Figure 1:
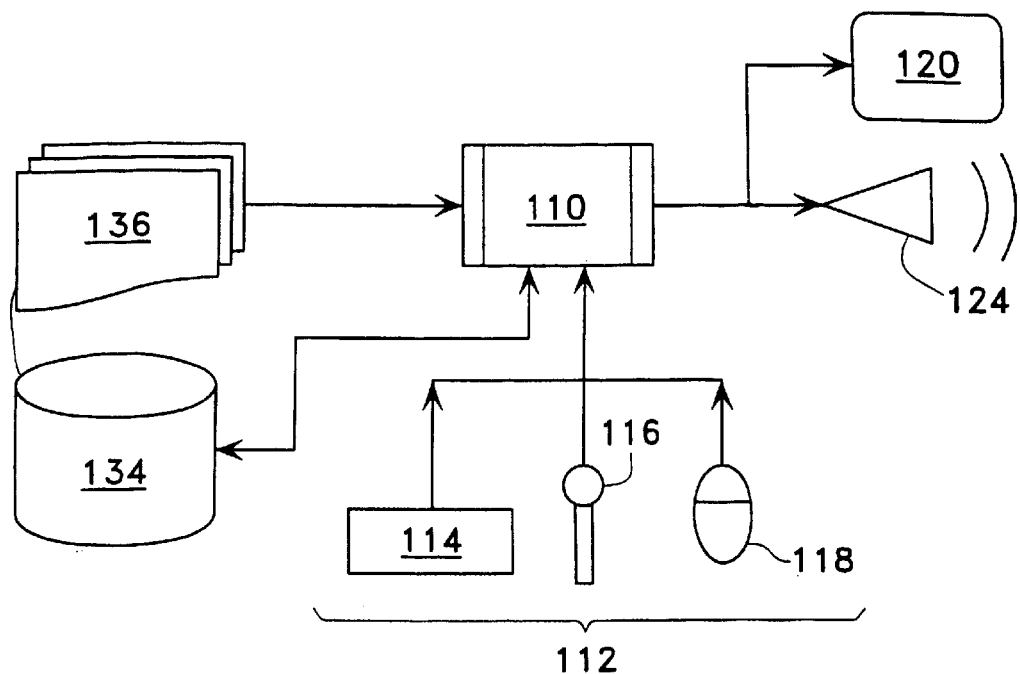
FIG. 1 is an overall logical block diagram of the various system elements, independent of whether there is a distributed architecture.

As shown in FIG. 1, the Programmed Processor 10 accepts student input from input devices and transmits output to output devices. The input devices preferably transmit student input to the Programmed Processor via a conventional user interface 112 and may include, but are not limited to, keyboards 114, microphones 116, and pointing devices 118. The output devices may include, but are not limited to, visual displays 120, storage devices 134, and speakers 124. Output from the Programmed Processor may include, but is not limited to, image sequences, hypotheses, supporting information, supplemental information, and feedback data. Feedback data may be provided to assert readiness for input, confirm successful completion of operations, and signal various other conditions.

The Programmed Processor 110 maintains storage data on storage devices 134. The storage data includes, for example, student records containing data collected from experiments, hypotheses selected and other responses provided. The storage data may also include, in no way by limitation, information including class and teacher identification, student identifications and groupings, mode of user login, and module and segments in progress.

The Programmed Processor 10 presents choices for experimental parameters, accepts students' selections of experimental parameters, and retrieves and presents the associated image sequence in response to students' requests. The Programmed Processor 110 presents successive frames of image sequences as still images in response to students' requests and reports measurements from these still images in response to students' requests. Students using the Programmed Processor 110 may view experiments as often as desired and collect data from experiments as often as desired.

While students collect measurements from an experiment, the Programmed Processor provides graphs and data summaries to aid students in analyzing the results. The Programmed Processor accepts students' selections of false and true hypotheses and optionally students' entry of hypotheses. The Programmed Processor accepts students' request to repeat any of these activities as often as students desire until they are able to arrive at a final hypothesis.

Students present their findings to each other and discuss these findings with each other. The teacher may participate in this discussion but may not provide answers. After the discussion period concludes, the teacher leads the class in identifying and understanding the principles involved.

A reasonably complete list of hypotheses is preferably included in each segment for a student's selection of true and false hypotheses. Supporting information such as a tutorial, historic background, vocabulary words, challenges, assignments, entry forms (including tests), and data from prior segments, may be added to each segment. The supporting information may contain links or pointers to supplemental information such as biographies, history, current news, and word definitions.

In a presently preferred embodiment the image sequences, hypotheses, supporting information, supplemental information, and browser-ready software (e.g. written in Java) reside on a server on the Internet. In this embodiment each student computer is made Internet ready by the installation of a browser and any other software required by the browser to present the supporting information and supplemental information and run the browser-ready software. In this embodiment the student computers are connected to the Internet and the browser is started to enable the students to work on a segment.

The students may begin their study of each module segment by interacting with the Programmed Processor. The Programmed Processor provides access to the experiments by displaying selected image sequences. Students are presented with supporting information to introduce a segment providing an overview of the kind of behavior they will investigate and may be required to answer questions as part of the introduction. Students then pick values for experimental parameters and observe one or more experiments. Students working at the same computer may take turns collecting measurements from the experiments. Students analyze the collected data with the aid of graphs and summaries provided by the Programmed Processor. At any time throughout this process students may identify false and true hypotheses. If no list of hypotheses is included with the segment, students may type their own hypotheses to describe alternative choices for what they observe in the experiments they view.

Students may view supporting information and supplemental information provided with a segment at any time. Students may repeat experiments and collect measurements from experiments as often as they desire.

Assuming that the invention is being used in a classroom environment, the students should present their observations, hypotheses, and other ideas to each other. The teacher may answer questions and provide guidance but should not disclose the underlying principles being taught at this time.

Following the student discussion period, the teacher should lead the group in identifying and understanding the underlying principles being taught. The teacher may disclose these principles at this time.

The detailed description of the invention is presented as follows:

Description of Experiments
Description of the Programmed Processor

Description of Experiments

Experiments are selected that result in observations that may be done through the Programmed Processor. A computer's capabilities typically provide for only visual and aural feedback data. Data collection and analysis may be performed by visual measurement based upon display of the experiment on the visual display screen. Sound may be used for feedback data, and sound intensity and/or frequencies may be measured.

Each measurement may be performed by the student positioning a pointing device on the visual display screen. The simplest type of experiment is one in which movement occurs over time allowing the software to measure position within the frame of a image sequence. The position consists of X and Y coordinates. The frame number (either a preprogrammed time interval, or selected by the student's operation of a mouse button or other signaling device) provides a third measured value that is proportional to time. These three measurements or dimensions of the experiment may be mathematically manipulated as appropriate to the experiment. In most cases, the Programmed Processor plots two derived values as the x and y coordinates of a graph. For example, a distance y may be plotted against time x (the frame number).

A possible fourth dimension consists of the value (color) of the pixel being selected by the pointing device and provides for additional variety in choosing mathematical manipulations. For example, the blue saturation may be plotted against frame number in a chemistry titration experiment where the frame number corresponds to the number of equal aliquots of titrant that have been added to the solution. In this way, a titration curve appears.

Another measurement dimension consists of sound parameters if sound measurement is preformed.

Depending upon the nature of the experiment, engineering units may be significant. In this instance, calibration of the experiment recording system provides the necessary proportions. For example, a ruler may be photographed using the same setup as the experiment. Then, the full width of the visual display screen in engineering units translates directly into the width of the visual display screen in pixels and the ratio takes its place with the other predetermined experimental parameters. The height ratio, although generally the same as the width, may be measured also. Translating the frame number into time requires knowledge of the frame rate. Note that the frame number may, as above, be translated into units other than time. Examples are amount of material added to an experiment, temperature in an experiment involving changing temperature, magnetic field strength, electric potential, and composition. The fourth dimension of pixel color may also be calibrated against color standards and consists of three components (e.g. red, green, and blue).

In addition to the measurements indicated above, an experiment might require intra-frame measurement as in the determination of wavelength by measuring the distance between successive peaks or troughs of waves in the same frame.

The Programmed Processor provides for semi-quantitative measurements by providing an optional menu. The student selects a value from the menu rather than taking the value directly from the position or color of the selected pixel.

In addition to quantitative measurement, the Programmed Processor also provides for qualitative experiments. In this case, the student views the image sequences and makes conclusions regarding the hypotheses without recourse to quantitative information or analysis. Newton's discovery that white light is composed of a number of colors that may be combined to recreate the white light falls into this category.

Each experiment is run for each set of values for the experimental parameters and recorded and edited to produce image sequences. Alternatively, various computational methods may be used to create the images as in a simulation. The format for the recording will ordinarily be a compressed format, for example MPEG or QuickTime, and the image sequences are preferably stored on a server computer system connected to the Internet.

The Programmed Processor

Reference should be made to the logic depicted in FIG. 12 as well as to the exemplary screen shots depicted in FIGS. 4 through 11.

The Programmed Processor 110 accepts student input from input devices 112 such as keyboards 114, microphones 116, and pointing devices 118 and presents image sequences, hypotheses, supporting information, supplemental information, and feedback data to students via output media such as a visual displays 120, recording devices 122, and speakers 124 (FIG. 1). Feedback data may be provided to assert readiness for input, confirm successful completion of operations, and signal various other conditions.

In one embodiment (FIG. 2), part of the software resides on a student terminal 130 and another part resides on a data server 132. The local computer handles image display and user data collection. The data server handles storage and retrieval of student data and may include storage devices 134 and may also serve the image sequences 136 for display by the local computer.

The Programmed Processor 110 maintains data on storage media containing account information including class and teacher identifications, student identifications and grouping, mode of user login, and module and segments in progress (Account Data). The Programmed Processor also maintains student records containing data collected from experiments, hypotheses selected, and other responses provided (FIG. 1).

Segment Content consists of experiment and parameter names; identification keys, parameter values, and specifications for the segment's image sequences; data collection and analysis requirements; hypotheses; supporting information; and supplemental information. Supporting information includes data such as tutorials, historic background, vocabulary words, challenges, assignments, entry forms (including tests), and data from prior segments. Supplemental information includes data such as biographies, history, current news, and word definitions.

Segment Content may be passed to the Programmed Processor in the form of parameters that are contained in the same storage unit (e.g. file) as the command to start the Programmed Processor. Alternatively Segment Content may be retrieved from storage media. Some Segment Content may be in the form of parameters and some retrieved from storage media. If an item of Segment Content may be passed in the form of a parameter and is also available in storage media, the Programmed Processor fetches the item from storage media only when it is not passed in the form of a parameter.

Figure 3:
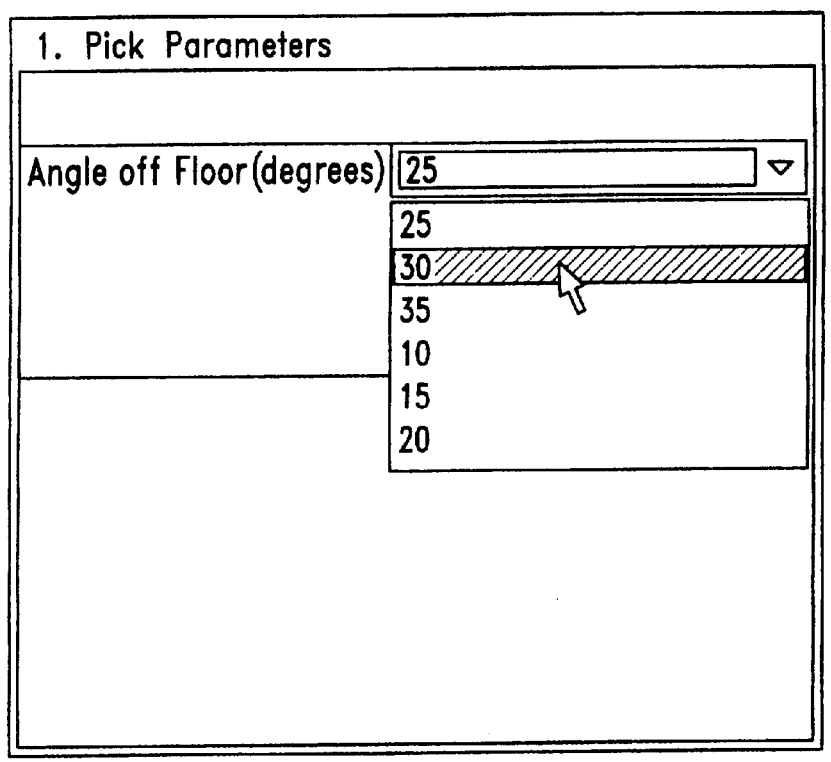
FIG. 3 is a screen shot of an active window for selection of experimental parameters.
Figure 4:
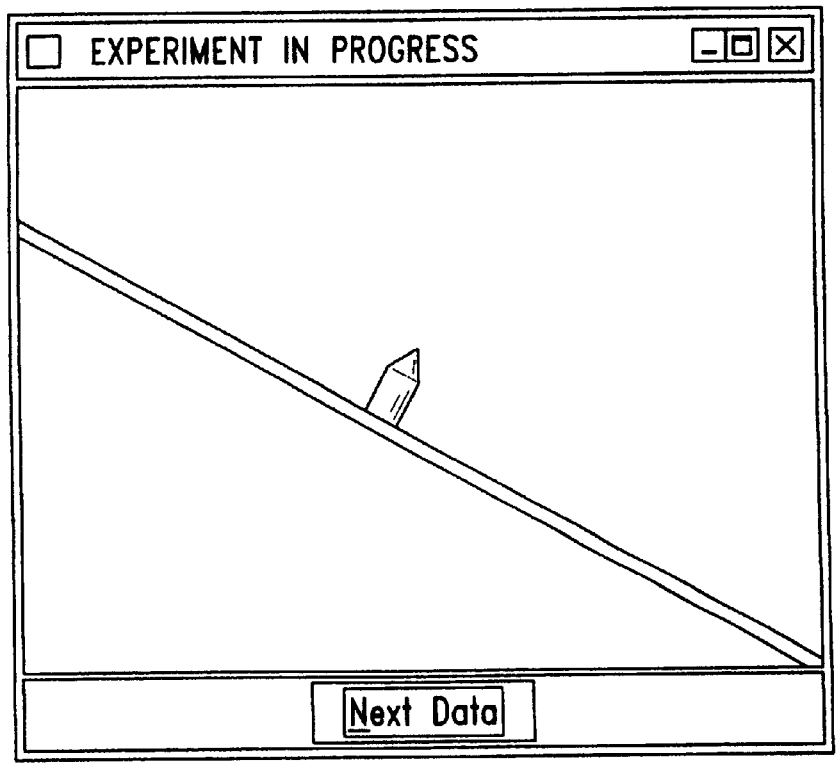
FIG. 4 is a screen shot of an active window for viewing the image sequence for the experiment.

As shown in FIG. 12, when the student selects an experiment 1200, the Programmed Processor locates the image sequence corresponding to the experiment 1202. In one embodiment, the student may select one or more experimental parameters. The Programmed Processor responds to the student's selection of parameters by saving the current choices. In one embodiment the parameter values are available as drop-down choice lists that allow single-value selection (FIG. 3). When the student selects the experiment the Programmed Processor attempts to map the selected parameter values into an image sequence key value. The available combinations of parameter values and image sequence keys are included in the Segment Content. If no image sequence can be found for the selected parameter values, the Programmed Processor notifies the student. If an image sequence is found, the Programmed Processor presents the image sequence to the student (FIG. 4).

The Programmed Processor plays the image sequence upon request 1204 and begins data collection mode upon request 1206. During playback, the student selects pixels from the image sequence for data collection, and the Programmed Processor records the data for pixel selections (positions, colors, image times, and/or choices from choice bar) and displays the data visually as a graph, curve fit to data, data table, and/or data summary during data collection 1210.

The Programmed Processor may use other software to display the image sequence. In one embodiment the Programmed Processor begins reading the image sequence and provides an area in one of its objects for showing the image sequence. In this embodiment the Programmed Processor presents the image sequence in its entirety, i.e. from the first to the last frame or from media time zero through media time duration.

The Programmed Processor waits for the end of media event. In one embodiment the Programmed Processor automatically repositions the image sequence to its beginning and stops at the first still image. In another embodiment the Programmed Processor waits for the student to request positioning to the first still image.

A image sequence specification contained in the Segment Data controls which frames will be used as still images, for example by specifying frames per time unit and time between still images. If the image sequence is recorded at 30 frames per second and it is desired to maintain 100 milliseconds between still images, still images may be displayed from frames 1, 4, 7, 1 1, etc. Because of the desirability of skipping header frames, the Programmed Processor may be configured to use a frame subsequent to the first frame for the first still image.

How the Programmed Processor accomplishes a stop with the appropriate still image in the display varies. Sometimes the Programmed Processor specifies a media time that occurs within the desired still-image frame and stops the image sequence presentation when that frame is apparent.

Figure 5:
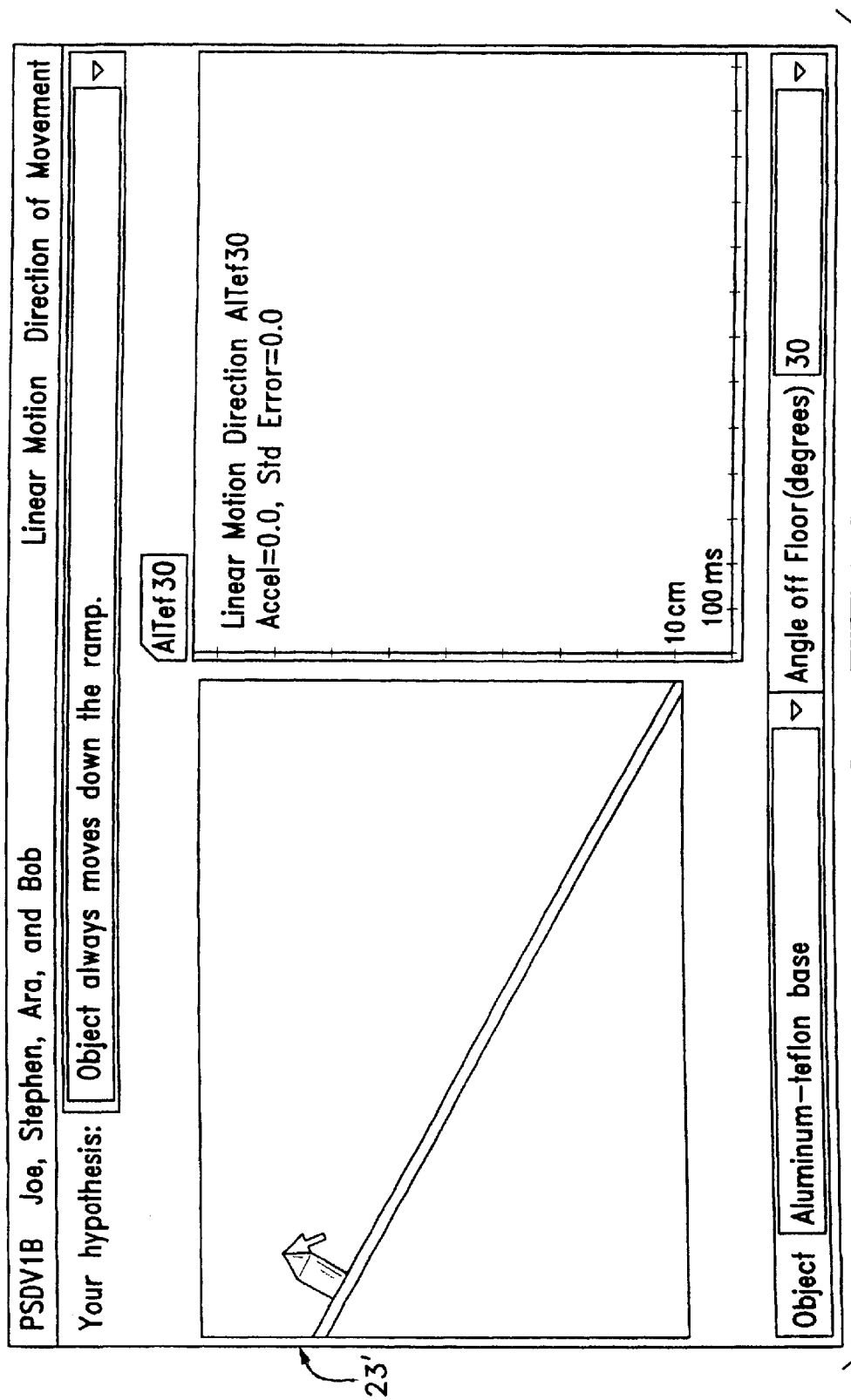
FIG. 5 is a screen shot of an active window for collecting data from a frame.

When the stop at a still image completes, the Programmed Processor determines from the Segment Content if data is available for collection. If data is available, the Programmed Processor enables data collection by use of a pointing device on the still image (FIG. 5). If the student uses a pointing device to take the first measurement from an experiment for which data collection occurred previously, the prior data collected and any graphical display thereof may be cleared at this time.

The student may be requested to supply his or her name to use as a label on the graph of the data collected. In one embodiment this occurs when the student requests positioning to the first still image. In another embodiment this occurs after the student takes the first measurement (FIG. 5). One embodiment of data collection and analysis is described below. The Programmed Processor enables data collection from the still image until there is no more data to collect.

The Programmed Processor accepts requests from the student to move to another (typically the next) still image unless the Programmed Processor determines that there are insufficient frames left in the image sequence to move to the requested frame and stop successfully. When this occurs in a typical embodiment, the Programmed Processor disables use of the next-still-image command.

Figure 7:
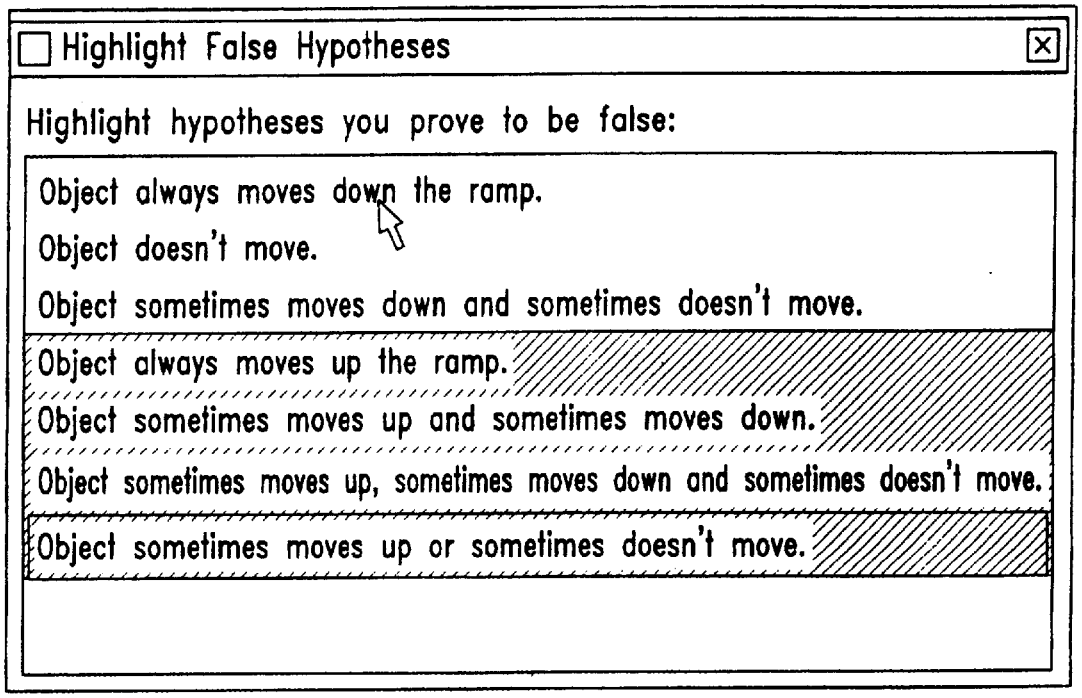
FIG. 7 is a screen shot of an active window for selection of false hypotheses.
Figure 8:
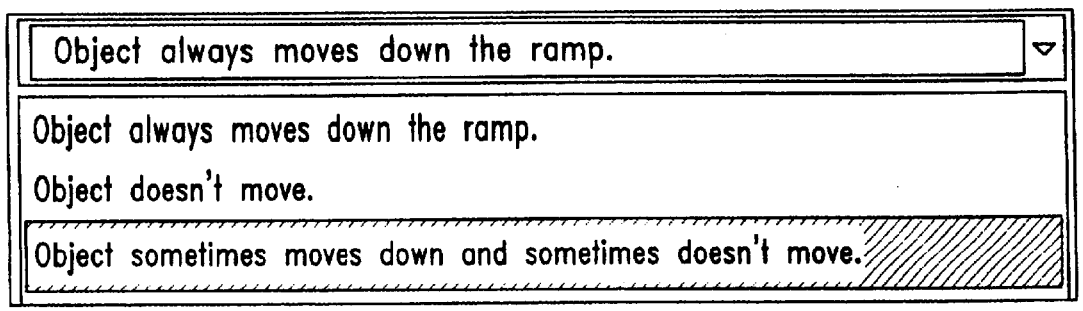
FIG. 8 is a screen shot of an active window for selection of true hypothesis.

In one embodiment students may request to see a list of all hypotheses (FIG. 7). In another embodiment (not shown), the list is always exposed. The Programmed Processor may ask students to identify false hypotheses by highlighting them. Students use a pointing device to highlight or remove a highlight from hypotheses in the list. In one embodiment the Programmed Processor removes from or adds to a list of possibly true hypotheses and the student may select a single hypothesis from this list (FIG. 8). In another embodiment (not shown) the Programmed Processor automatically chooses the student's hypothesis from the hypotheses list when all but that hypothesis have been highlighted as false. If no hypotheses are included in the Programmed Processor Content, the Programmed Processor accepts hypotheses from the student; in one embodiment the Programmed Processor enables entry of a single hypothesis and in another embodiment the Programmed Processor enables entry of a hypotheses list.

Figure 9:
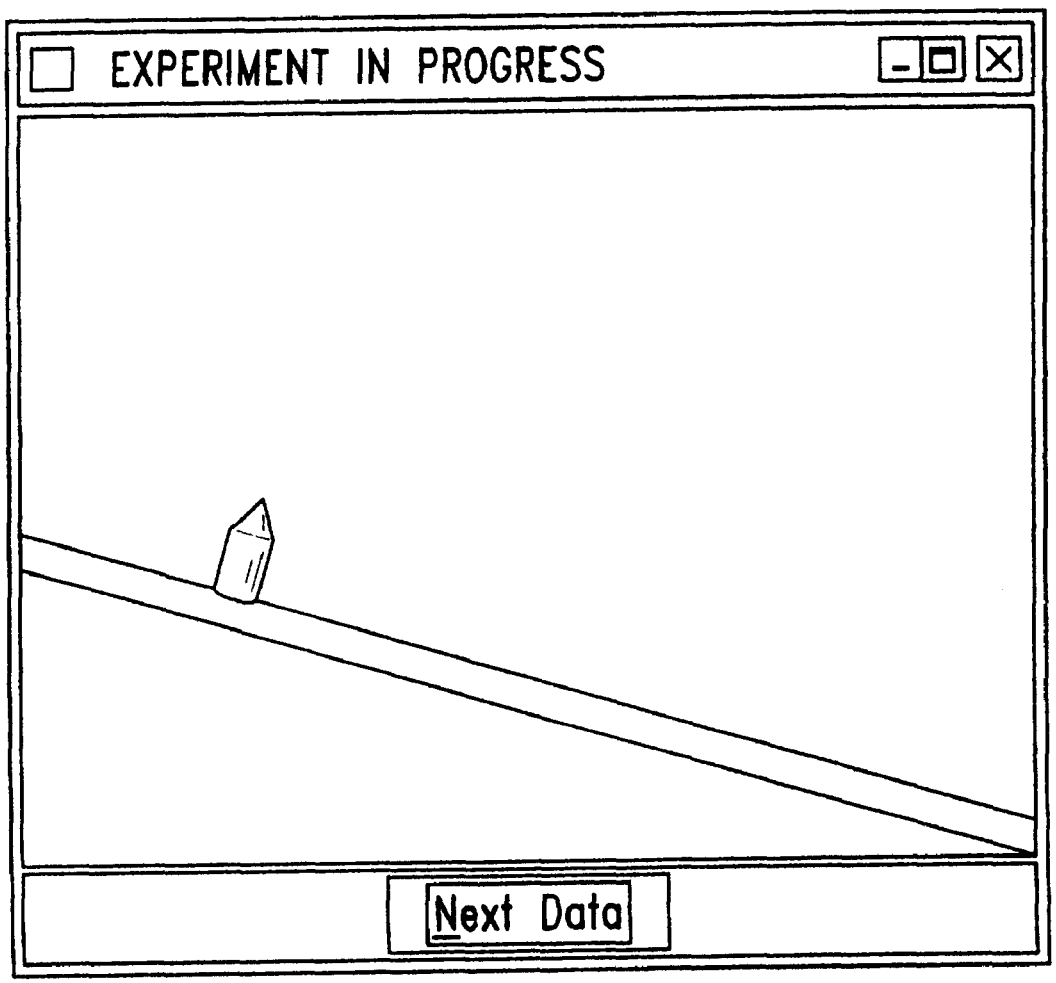
FIG. 9 is a screen shot of an active window for viewing a second experiment.

When the student is ready to view another experiment or a prior experiment, the student may select the parameters and request the Programmed Processor to run the experiment (FIG. 9). When a new experiment is run or a prior experiment is rerun, the current experiment's data is saved for easy retrieval later.

All experiments viewed in a segment are arranged for easy retrieval. In one embodiment tabbed panels are used. Each tab contains the experiment's key value, which should encode the experimental parameter values. In addition, each tab should present a longer description of the experiment it contains when a pointing device remains on it for a short time.

Figure 10:
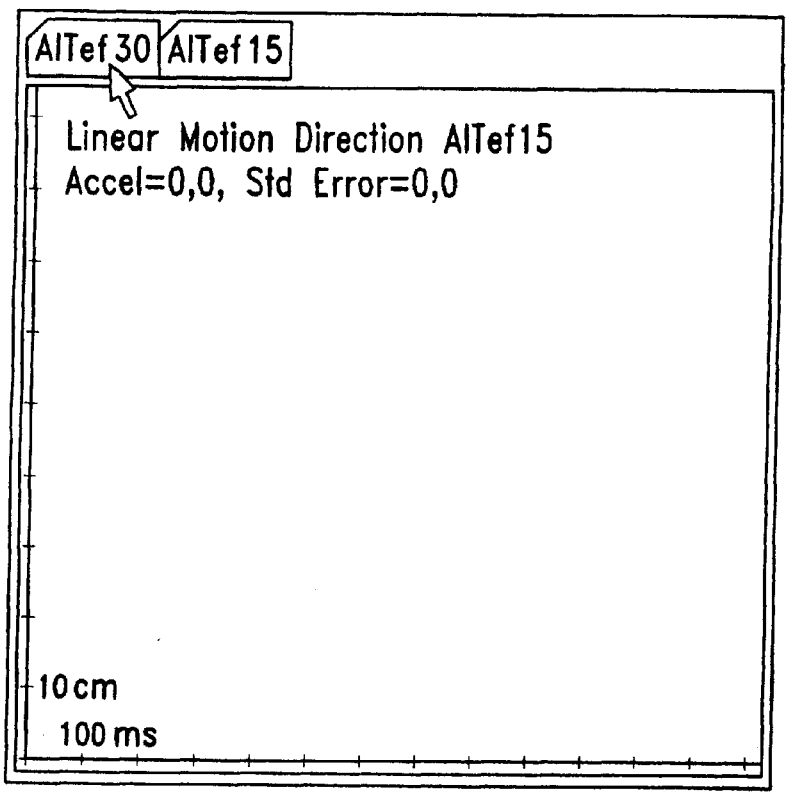
FIG. 10 is a screen shot of a tabbed display for selecting a first prior experiment and its associated data.
Figure 11:
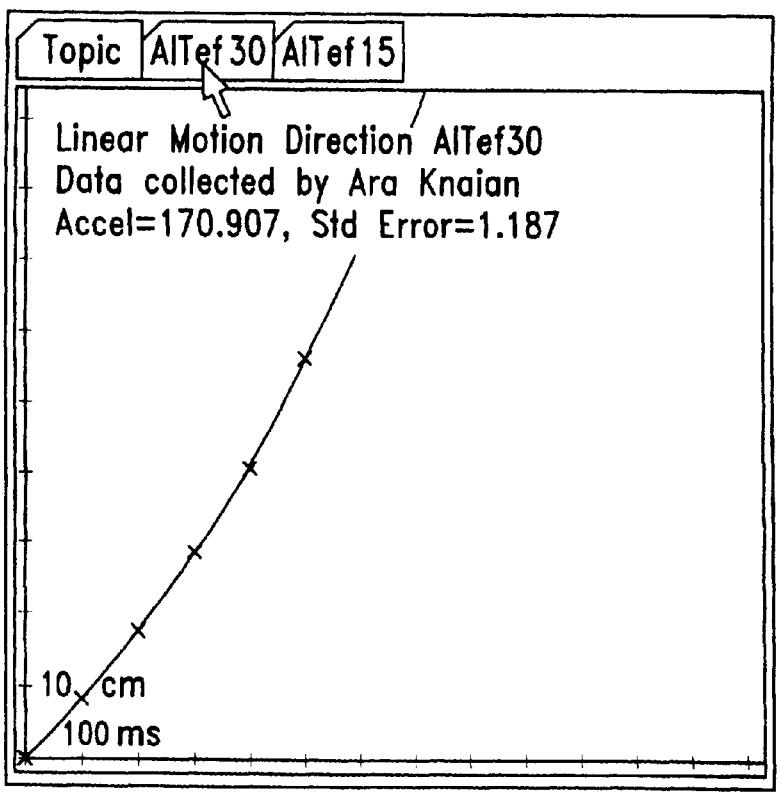
FIG. 11 is a screen shot of a tabbed display for selecting a second prior experiment and its associated data.

The graph and data for each experiment viewed in a segment is displayed when the student retrieves the experiment. In one embodiment the graph and data are displayed when the student uses a pointing device to pick out the experiment's tabbed panel (FIGS. 10, 11). This is a means for students to view the graphs associated with each experiment to compare results. In one embodiment all graphs may be combined on a single panel for easier comparison.

The Programmed Processor listens for and responds to events generated by experiment retrieval, e.g. selection of tabbed panels. In one embodiment an experiment is automatically rerun when it is retrieved. In another embodiment the experiment becomes the active experiment but is not rerun until the student makes that request.

In a preferred embodiment, the student chooses the next activity from the following: (A) Select another experiment; (B) Rerun same experiment; (C) Select hypotheses; and (D) Leave lesson 1210. If the student chooses to select another experiment 1210A, the Programmed Processor goes by route A to prompt the student to select an experiment and the student selects an experiment 1200 again. If the student chooses to rerun the same experiment 1210B, the programmed processor goes by route B to locate the image sequence corresponding to the experiment 1202. If the student chooses to select hypotheses, the Programmed Processor goes by route C to eliminate one or more hypothesis from a user-written or pre-written list 1210.

If enough experiments were completed or the student decides to end the segment anyway, the Programmed Processor examines the true hypothesis selected by the student. If a true hypothesis is not identified, the Programmed Processor may present a warning message and ask the student to confirm segment end with no hypothesis. If the hypothesis is identified, the Programmed Processor may present the hypothesis and ask the student to confirm segment end with that hypothesis.

When the student has eliminated one or more hypotheses from the user-written or pre-written list, the student chooses the next activity 1210. If the student chooses to leave the lesson 1210D, the Programmed Processor goes by route D to check if sufficient experiments were done and all but one hypothesis eliminated and prompts the student appropriately 1212. The Programmed Processor asks whether the student accepts leaving the lesson 1214. If yes, the Programmed Processor leaves the lesson and enters the lab report 1216. If no, the Programmed Processor prompts the student to select an experiment and the student selects an experiment 1200.

Data Collection and Analysis

The Segment Content contains data collection and analysis requirements that determine whether the data is quantitative or qualitative. If the experiment produces quantitative data, the data collection requirements specify which raw data to collect and how to process this data to create information in engineering units.

In order to collect data associated with the position of the pointing device 23' (FIG. 5), the Programmed Processor listens for and responds to events generated by the pointing device.

The raw data that can be collected consist of:

1. image sequence frame number (ordinal number)
2. x-coordinate of pixel selected (in pixels)
3. y-coordinate of pixel selected (in pixels)
4. color of pixel (may be RGB or other color system)
5. sound parameters The color has three separate values associated with it. For example, if the RGB color system is used, then it has separate red, green, and blue values. These are readily converted to other color systems that also use three separate color coordinates.

Each data point collected may contain six or more raw data values (frame, x, y, r, g, b, and sound parameters). In addition, a value from a pop-up menu (not shown) may also be collected.

The Programmed Processor stores the data values for each point collected in an array or other data structure that allows for quick plotting.

The data collection requirements in the Segment Content determine how many points may be collected in a single frame. As few as zero (for single-valued purely qualitative experiments) points may be selected. Currently envisioned experiments may require two points be collected in a single frame. Future requirements may expand that number, and the Programmed Processor architecture preferably allows for a fairly large number of points to be collected in a single frame.

The data analysis requirements in the Segment Content determine how to process the collected raw data.

For some experiments the raw data values must be combined. The data analysis requirements select the method of combination. Examples include converting x and y pixel values to distance in pixels (square root of sum of squares) and determining velocity (dividing incremental distance in pixels by incremental frames).

The data analysis requirements specify the engineering units, if any, and how to convert the raw data to the engineering units for presentation. Typically, this involves multiplying the raw data or combined raw data by a constant. For example, if the x and y pixel values have been combined to measure distance in pixels, the distance value is converted from pixels to centimeters by multiplying it by centimeters per pixel.

The data analysis requirements may specify non-linear data transformation. Non-linear transformation must be programmed for each new type. For example a logarithmic type transformation requires taking the logarithm of a combination of data values.

Figure 6:
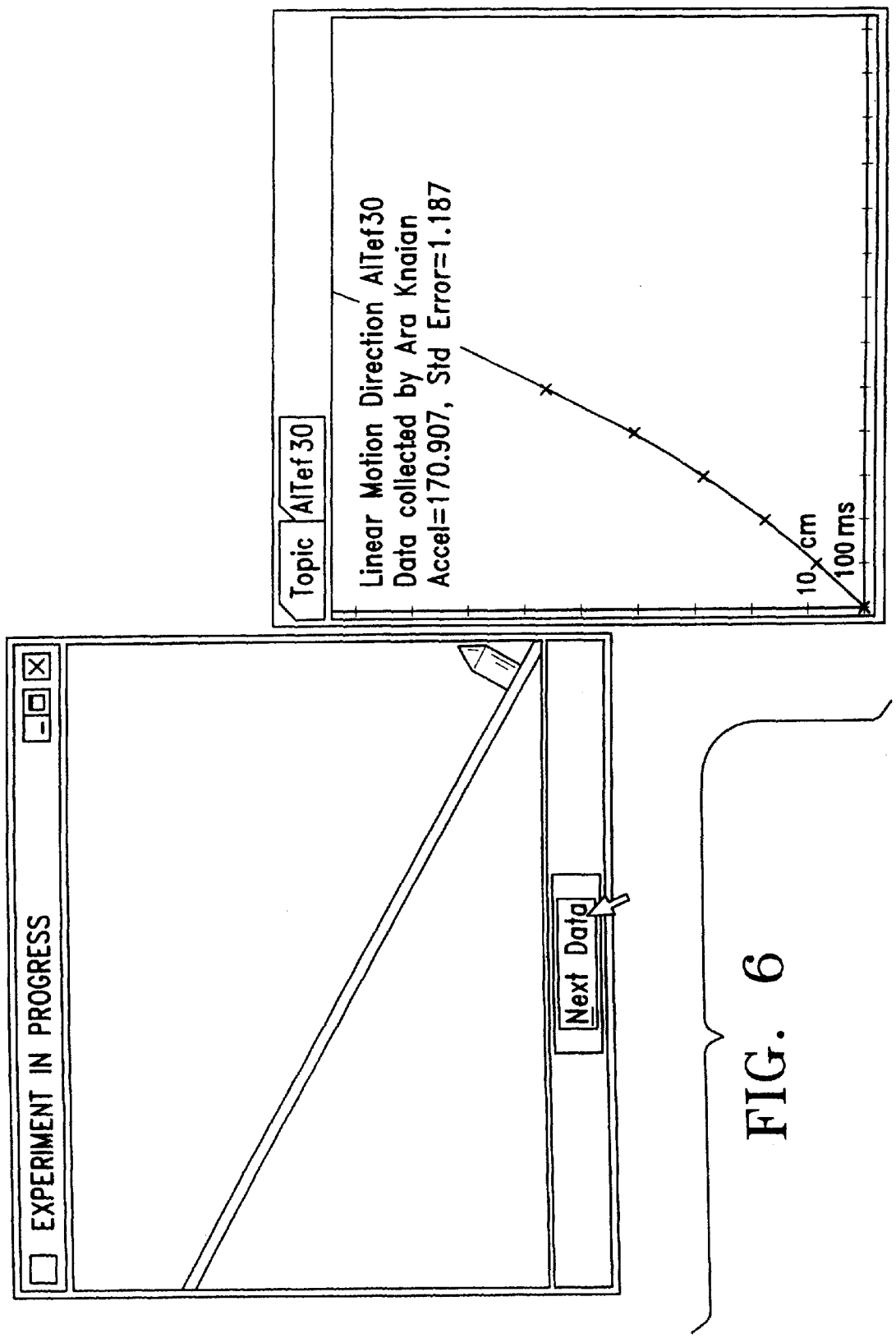
FIG. 6 is a screen shot of an active window of running an experiment and a tabbed display of the associated data.

As shown in FIG. 6, the Programmed Processor may calculate and draw the axes for graphing data. The data analysis requirements may provide the range of data for each experiment clip. If x and y ranges are not provided, then the total display width and height are used. The Programmed Processor reviews the x and y ranges for all of the image sequences in the segment and determines the range for both axes of the graph. The data analysis requirements may specify that all graphs for the segment use the same range for axes to permit easy comparison of graphs. Tick marks may be drawn and located so that their number is reasonable and the units for one tick come out to be a round number. The axes are positioned so that they appear on the graph.

From the data ranges determined in the previous step and the space (in pixels) reserved for the graph, the conversion from engineering units to pixels (in both x and y directions) is computed.

After collecting each point, the entire graph including axes, tick marks, points, fitted curve, and derived data is redrawn.

The data analysis requirements in the Segment Content specify how to fit a curve to the data. In one embodiment, three choices are provided:

1. None
2. Linear least squares
3. Quadratic least squares

Linear least squares fit uses a well-known algorithm to calculate a straight line fitting the available data points. This algorithm must be applied to the converted data to obtain two derived values: a and b in $y=ax+b$. These values must be used to plot the straight line representing the fit.

Quadratic least squares fit uses a standard algorithm to calculate a parabola fitting the available data points. This algorithm must be applied to the converted data to obtain three derived values: a, b, and c in $y=a^2+bx+c$. These derived values must be used to plot the parabola representing the fit.

Other embodiments may include sinusoidal, step and other functional fits.

The data analysis requirements determine which of these derived values, if any, are displayed, how they are scaled into engineering units for display, and the labels to use in the display.

The Programmed Processor also calculates the standard error (a dimensionless quantity related to the goodness of fit) from the differences between the experimental values and the fitted values. The data analysis requirements determine if the standard error is reported.

The Programmed Processor draws a straight line fitting the data by using its equation, $y=ax+b$. The Programmed Processor requests that a straight line be drawn between the point representing the minimum x pixel value and the point representing the maximum x pixel value.

The Programmed Processor plots a parabola fitting the data as a series of straight lines between successive x pixel values: a line between 0 and 1, a line between 1 and 2, etc. The y values for the lines are determined from the curve's equation, $y=ax^2+bx+c$.

The Programmed Processor refrains from plotting the curve until sufficient data are available to determine the curve (2 points for linear, 3 points for quadratic).

The Programmed Processor enables data collection from the still image until there is no more data to collect.

What is claimed is:

1. An apparatus for teaching one or more students, comprising:
    a data server to store one or more digital representations of image sequences that represent one or more predefined experiments;
    a student terminal to present the one or more digital representations to a student;
    a user interface to facilitate selection by the student of portions of the one or more digital representations and to capture experimental data from the portions selected by the student; and
    a programmed processor to automatically provide instructional feedback data to the student based on the experimental data captured, wherein the programmed processor receives input from and sends output to the data server, the student terminal receives input from the programmed processor, and the user interface sends output to the programmed processor.

2. The apparatus of claim 1 wherein:
    the student terminal displays multiple hypotheses associated with the one or more predefined experiments.

3. The apparatus of claim 2 wherein:
    the student is given an opportunity to identify one or more of the multiple hypotheses as being judged false or as being judged true.

4. The apparatus of claim 1 wherein:
    the student terminal displays supplemental instructional material to the student.

5. The apparatus of claim 1 further comprising:
    an instructor terminal to permit an observer to monitor and review the performance of the student.

6. The apparatus of claim 1 wherein:
    the experimental data captured is an attribute of the portions selected by the student.

7. The apparatus of claim 6 wherein:
    the attribute is derived from a segment of an audible waveform associated the portions selected by the student.

8. The apparatus of claim 1 wherein:
the user interface includes a pointing device to facilitate the selection of the portions selected by the student.

9. The apparatus of claim 8 wherein:
the pointing device is placed on one of the portions selected by the student and the experimental data is captured as a function of a position of the pointing device.

10. The apparatus of claim 9 wherein:
the position of the pointing device is selected from the group consisting of the horizontal position of the pointing device, the vertical position of the pointing device, and an attribute of a pixel.

11. The apparatus of claim 8 wherein:
the pointing device is activated to select the portions selected by the student and the experimental data captured corresponds to a media time at which the pointing device is activated.

12. The apparatus of claim 1 wherein:
the experimental data captured is derived from a selection list associated with the portions selected by the student.

13. The apparatus of claim 1 wherein:
the one or more images are selected from the group consisting of frames of a video clip depicting a real experiment, still photographs of real experiments, and animations of simulated experiments.

14. The apparatus of claim 13 wherein:
the animations of simulated experiments are generated in real time.

15. The apparatus of claim 1, wherein:
the programmed processor has a distributed architecture.

16. The apparatus of claim 1, wherein:
the data server is connected to the student terminal over a LAN or internet.

17. An apparatus for teaching one or more students, comprising:
a student terminal to store one or more digital representations of image sequences that represent one or more predefined experiments and to present the one or more digital representations to a student;
a user interface to facilitate selection by the student of portions of the one or more digital representations and to capture experimental data from the portions selected by the student; and
a programmed processor to automatically provide instructional feedback data to the student based on the experimental data captured, wherein the programmed processor receives input from and sends output to the data server, the student terminal receives input from the programmed processor, and the user interface sends output to the programmed processor.

18. A method for teaching a student comprising:
presenting one or more digital representations of image sequences that represent one or more predefined experiments to the student;
facilitating selection by the student of portions of the one or more digital representations; and
capturing experimental data from the portions selected by the student.

19. The method of claim 18, further comprising:
automatically providing instructional feedback data to the student based on the experimental data captured.

20. The method of claim 18, further comprising:
storing the one or more digital representations of image sequences that represent one or more predefined experiments.

21. The method of claim 18, wherein:
the capturing of the experimental data is concurrent with the facilitating selection by the student of portions of the one or more digital representations.

22. A method for teaching a student comprising:
storing one or more digital representations of image sequences that represent one or more predefined experiment on the server side of a network;
providing over the network the one or more digital representations of image sequences to be presented to the student;
facilitating selection on the user side of the network by the student of portions of the one or more digital representations;
capturing experimental data on the user side of the network from the portions selected by the student; and
receiving over the network the experimental data captured.

23. The method of claim 22, further comprising:
automatically providing over the network instructional feedback data to the student based on the experimental data captured.

24. A program code storage device for teaching a student, comprising:
a machine-readable storage medium; and
machine-readable program code, stored on the machine-readable storage medium, the machine-readable program code having instructions to:
present one or more digital representations of image sequences that represent one or more predefined experiments to the student,
facilitate selection by the student of portions of the one or more digital representations, and
capture experimental data from the portions selected by the student.

25. The program code storage device of claim 24, wherein:
the machine-readable program code further includes instructions to:
automatically provide instructional feedback data to the student based on the experimental data captured.

26. The program code storage device of claim 24, wherein:
the machine-readable program code further includes instructions to:
store the one or more digital representations of image sequences that represent one or more predefined experiments.

27. The program code storage device of claim 24, wherein:
the capture of experimental data is concurrent with the facilitation of selection by the students of the one or more digital representations.

28. The program code storage device of claim 24, wherein:
the instructional feedback data includes a measurement of the experimental data captured.

29. The program code storage device of claim 24, wherein:
the instructional feedback data includes a data summary based on the experimental data captured.

30. The program code storage device of claim 29, wherein:
the data summary includes a comparison of the experimental data captured from multiple performances of a same experiment.

31. The program code storage device of claim 29, wherein:
   the data summary includes a comparison of the experimental data captured from different experiments exemplifying a same scientific principle.

32. The program code storage device of claim 24, wherein:
   the machine-readable program code further includes instructions to:
      display multiple hypotheses associated with the one or more predefined experiments.

33. The program code storage device of claim 32, wherein:
   the machine-readable program code further includes instructions to:
      give the student an opportunity to identify one or more of the multiple hypotheses as being judged false or as being judged true.

34. The program code storage device of claim 32, wherein:
   the machine-readable program code further includes instructions to:
      test the multiple hypotheses using different parameter values associated with different predefined experiments comprising a set of experiments exemplifying a same scientific principle.

35. The program code storage device of claim 24, wherein:
   the machine-readable program code further includes instructions to:
      display supplemental instructional material to the student.

36. The program code storage device of claim 24, wherein:
   the instructional feedback data includes an evaluation of a performance of the student.

37. The program code storage device of claim 24, wherein:
   the instructional feedback data includes hints and instructions for successful conclusion of one of the one or more predefined experiments.

38. The program code storage device of claim 24, wherein:
   the machine-readable program code further includes instructions to:
      display background information concerning an exemplified scientific principle while the experimental data is being captured.

39. The program code storage device of claim 24, wherein:
   the experimental data captured is an attribute of the portions selected by the student.

40. The program code storage device of claim 24, wherein:
   the experimental data captured is derived from a selection list associated with the portions selected by the student.

41. The program code storage device of claim 24, wherein:
   the one or more images are selected from the group consisting of frames of a video clip depicting a real experiment, still photographs of real experiments, and animations of simulated experiments.

42. The program code storage device of claim 24, wherein:
   the animations of simulated experiments are generated in real time.

43. The program code storage device of claim 24, wherein:
   the one or more predefined experiments exemplify a scientific principle.

* * * * *